United States Patent
Hansen et al.

(10) Patent No.: US 6,949,930 B2
(45) Date of Patent: Sep. 27, 2005

(54) TIME DOMAIN INDUCTION METHOD AND APPARATUS FOR LOCATING BURIED OBJECTS IN A MEDIUM BY INDUCING AND MEASURING TRANSIENT EDDY CURRENTS

(75) Inventors: Thorkild Hansen, Brighton, MA (US); Michael L. Oristaglio, Newtown, CT (US)

(73) Assignee: Witten Technologies, Inc., Boston, MA (US)

( * ) Notice: Subject to any disclaimer, the term of this patent is extended or adjusted under 35 U.S.C. 154(b) by 0 days.

(21) Appl. No.: 10/117,133

(22) Filed: Apr. 8, 2002

(65) Prior Publication Data

US 2003/0189428 A1 Oct. 9, 2003

(51) Int. Cl.⁷ ................................................ G01V 3/11
(52) U.S. Cl. ...................................... 324/329; 324/336
(58) Field of Search .................... 324/67, 326, 327, 324/328, 329, 239, 334, 336, 337

(56) References Cited

U.S. PATENT DOCUMENTS

| | | | |
|---|---|---|---|
| 3,665,466 A | | 5/1972 | Hibbard |
| 4,905,008 A | | 2/1990 | Kawano et al. |
| 5,014,008 A | * | 5/1991 | Flowerdew .................. 324/326 |
| 5,182,516 A | * | 1/1993 | Ward et al. .................. 324/326 |
| 5,248,975 A | | 9/1993 | Schutz |
| 5,339,080 A | | 8/1994 | Steinway et al. |
| 5,438,266 A | * | 8/1995 | Tsang .......................... 324/326 |
| 5,499,029 A | | 3/1996 | Bashforth et al. |
| 5,576,624 A | * | 11/1996 | Candy ......................... 324/329 |
| 5,579,430 A | | 11/1996 | Grill et al. |
| 5,742,735 A | | 4/1998 | Eberlein |
| 5,835,053 A | | 11/1998 | Davis |
| 5,835,054 A | | 11/1998 | Warhus et al. |
| 5,912,639 A | | 6/1999 | Beckner |
| 5,920,285 A | | 7/1999 | Benjamin |
| 6,002,357 A | | 12/1999 | Redfern et al. |
| 6,084,412 A | * | 7/2000 | Guo et al. .................. 324/336 |
| 6,100,839 A | | 8/2000 | Heger et al. |
| 6,130,641 A | | 10/2000 | Kraeutner et al. |
| 6,541,966 B1 | * | 4/2003 | Keene ......................... 324/243 |
| 6,667,709 B1 | * | 12/2003 | Hansen et al. ................ 342/22 |

FOREIGN PATENT DOCUMENTS

| | | |
|---|---|---|
| JP | 59-37474 | 2/1984 |
| JP | 59-231466 | 12/1984 |
| JP | 60-235080 | 11/1985 |
| JP | 1-274092 | 11/1989 |
| WO | WO 88/04063 | 6/1988 |

OTHER PUBLICATIONS

J.K. van Deen and J.W. de Feijter, "Three–Dimensional Ground Probing Radar", Geological Survey of Finland, Special Paper 16, pp. 35–40, Jun. 1992.

* cited by examiner

Primary Examiner—Jay Patidar
(74) Attorney, Agent, or Firm—McDermott Will & Emery LLP

(57) ABSTRACT

A method and apparatus locates buried objects in conductive soil by creating a direct current in a transmitting loop, periodically terminating the direct current in the transmitting loop to create an eddy current in the conductive soil using time domain induction, receiving a magnetic field resulting from the eddy current running through the conductive soil, and locating the buried object using the received magnetic field.

25 Claims, 7 Drawing Sheets

TIME DOMAIN INDUCTION METHOD AND APPARATUS FOR LOCATING BURIED OBJECTS IN A MEDIUM BY INDUCING AND MEASURING TRANSIENT EDDY CURRENTS

BACKGROUND OF THE INVENTION

The present invention relates to time domain induction systems and methods, and more particularly to time domain induction systems and methods for identifying buried objects, which includes objects that are at least partially buried.

A precise map of the subsurface avoids damaging existing utilities, such as water, gas, and electric lines, during excavation. For example, prior to digging trenches to install new pipes, a construction crew must know where the existing pipes are buried to avoid damaging them. A lack of accurate maps of construction sites results in thousands of broken pipes and billions of dollars in repair costs.

Conventional pipe location equipment requires an operator to connect a transmitter directly to a pipe. After making the connection, the conventional equipment injects a single frequency current into the pipe at a location where the pipe is exposed (for example, by connecting to a water pipe at a fire hydrant). The conventional equipment then measures a resulting magnetic field on the ground surface. Such conventional equipment cannot locate pipes that are not at least partially exposed above ground because direct connection to the pipes are not possible. Furthermore, these conventional devices can determine the depth and direction of a pipe when only single pipes are running through a site. If multiple pipes are buried in a field of interest, these conventional devices cannot properly locate them.

Other types of conventional utility locating devices, which do not require direct connection to an exposed portion of a pipe, include wave propagation systems, such as ground penetrating radar (GPR) equipment. GPR-based wave propagation utility location systems tend to work well when soil conductivity is relatively low, but do not work as well when conductivity is high because the waves attenuate rapidly through the soil prior to reaching the pipes.

Another type of system is suitable for use in mining applications in conductive soil to locate buried objects. These devices, however, are designed to detect conductive ores, aggregates, aquifers, bedrock, and buried waste, but such systems are not suitable for locating buried pipes. One reason why such conventional systems are not suited for locating buried objects such as pipes is that the geometry of the transmitting antennas in these systems does not allow the systems to couple effectively with buried objects having the geometry of pipes. For example, a conventional system described in U.S. Pat. No. 5,654,637 to McNeill entitled "Method for Detecting Buried High Conductivity Objects Including Scaling of Voltages for Eliminating Noise of a Particular Depth" ("the '637 patent"), has one square transmitting loop and two square receiving loops placed at different heights. The system described in the '637 patent estimates the depth of buried objects, such as barrels, from a ratio of the output voltages of the receiving loops. The system computes this depth estimate by modeling the buried object as a sphere. The sphere model used in conventional systems is not appropriate for many kinds of buried targets, including pipes, because the field emitted by a sphere is different from the field emitted by an elongated object such as a pipe. Moreover, a single square transmitting loop does not couple to pipes that lie directly beneath it because the total induced current through a cross section of the pipe is zero and the emitted magnetic field decays rapidly away from the pipe. Accordingly, conventional systems are severely limited in their ability to detect buried objects such as pipes.

A time domain induction system consistent with the present invention can overcome the disadvantages of conventional systems. Further, a time domain induction system consistent with the present invention can fit onto a moving vehicle, trailer, or portable housing so that subsurface images can be formed as the system is moving.

SUMMARY OF THE INVENTION

The present invention provides methods and apparatus for locating buried objects by inducing transient eddy currents and measuring the fields the transient eddy currents emit. Additional features and advantages of the invention will be set forth in the description which follows, and in part, will be apparent from the description, or may be learned by practicing the invention. The features and other advantages of the invention will be realized and obtained by the method and apparatus particularly pointed out in the written description and the claims hereof as well as in the appended drawings.

To achieve these and other advantages and in accordance with the invention, as embodied and broadly described, a system consistent with the present invention identifies buried objects using time domain induction. An apparatus for locating a buried object in conductive soil comprises a transmitting loop, a direct current generator feeding the transmitting loop, a time domain transmitter current controller, a magnetic field detector, and a locator for locating the buried object using a received magnetic field resulting from an eddy current running through the conductive soil. A method for locating a buried object in conductive soil comprises creating a direct current in a transmitting loop, periodically terminating the direct current in the transmitting loop to create an eddy current in the conductive soil using time domain induction, receiving a magnetic field resulting from the eddy current running through the conductive soil, and locating the buried object using the received magnetic field.

Both the foregoing general description and the following detailed description are exemplary and explanatory and are intended to provide further explanation of the invention as claimed.

DESCRIPTION OF THE FIGURES

The accompanying drawings, which are incorporated in and constitute part of the specification, illustrate embodiments of the invention and together with the general description given above and detailed description of the embodiments given below, serve to explain the principles of the invention.

DETAILED DESCRIPTION OF THE INVENTION

Figure 1:
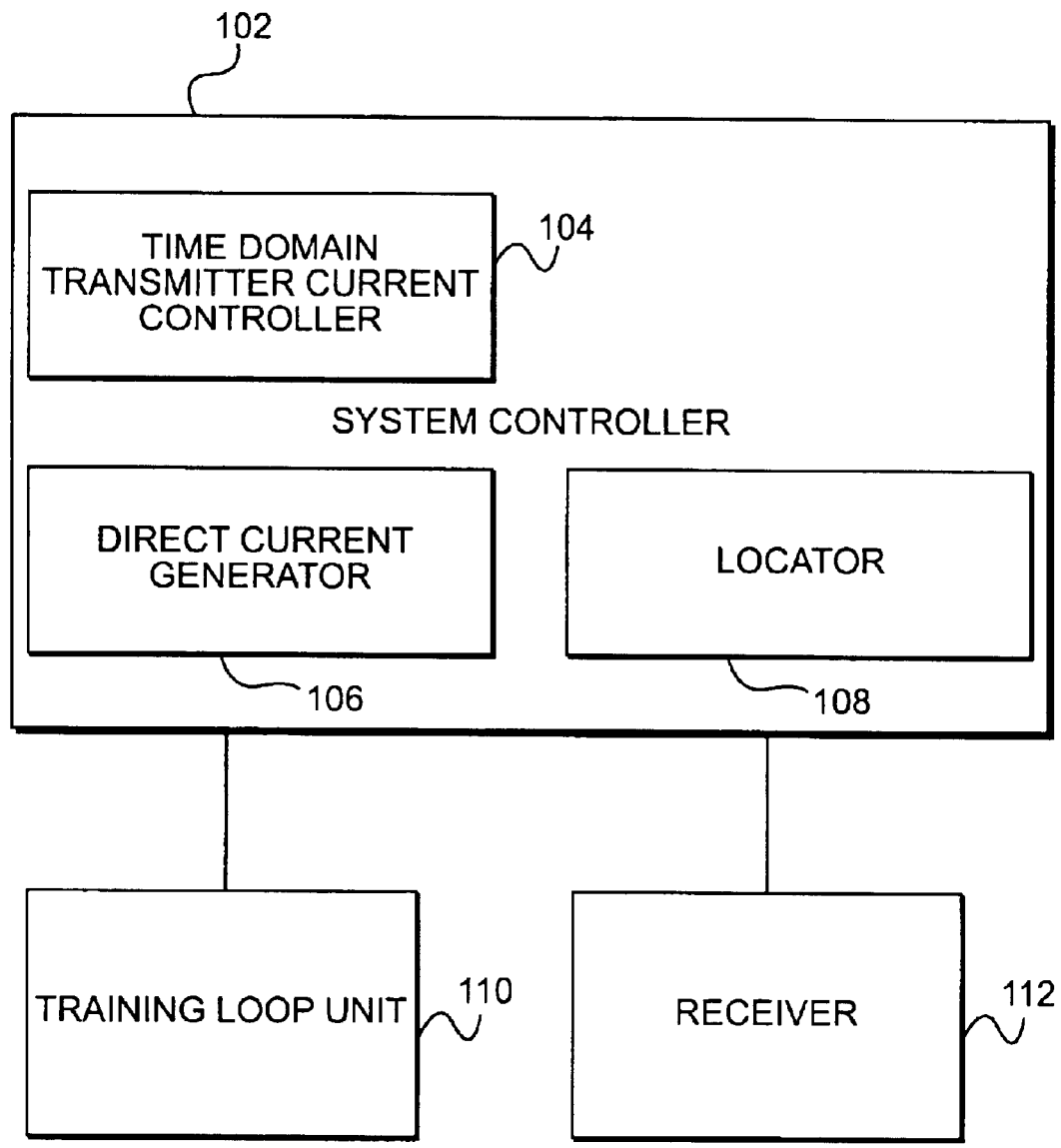
FIG. 1 is a block diagram of an embodiment of an apparatus for identifying buried objects using time domain induction consistent with the present invention.

A method and apparatus is disclosed for identifying buried objects using time domain induction. As used herein, "buried objects" include objects that are fully or partially buried. FIG. 1 illustrates an embodiment of an apparatus for identifying buried objects using time domain induction consistent with the present invention. The apparatus of FIG. 1 includes system controller 102, transmitting loop unit 110, and receiver 112. System controller 102 includes time domain transmitter current controller 104, direct current ("DC") generator 106, and locator 108.

System controller 102 provides signal processing and signal control functions for the system. Time domain transmitter current controller 104 controls direct current generator 106. Examples of suitable commercially available time domain transmitter current controller 104 and DC generator 106 include: SIROTEM Mk3 by Geoinstruments, TEM47 by GEONICS, and NT 20 by ZONGE. Direct current generator 106 feeds a DC signal into transmitting loop unit 110. Time domain transmitter current controller 104 controls, for example, the on and off period during which DC generator 106 applies a signal to transmitting loop unit 110. System controller 102 also includes locator 108, which processes signals received from receiver 112 to determine where buried objects are located.

Locating objects using induction works well in many cases where radar fails. Consider, for example, a plane wave that propagates in homogeneous soil with permeability $\mu_0 = 1.256 \cdot 10^{-6}$ H/m, relative permittivity $\epsilon_r$, and conductivity $\sigma$. Assume that the plane wave is time harmonic with angular frequency $\omega = 2\pi f$. If the wave propagates along the z axis, the plane wave behavior can be modeled using the equation $e^{ikz}$ where $$k = \sqrt{\omega^2 \mu_0 \epsilon_0 \epsilon_r + i\omega \mu_0 \sigma}$$

is the propagation constant. Here $\epsilon_0 = 8.85 \cdot 10^{-12}$ F/m and $i = \sqrt{-1}$. The decay of the plane wave as it travels through the soil is then given by $e^{-Im(k)z}$ where Im(k) denotes the imaginary part of k. From the table on p. 33 of "Surface Penetrating Radar," by Daniels, IEE Press 1996, it follows that for typical soils, $\epsilon_r$ is in the range from 2 to 30, and $\sigma$ is in the range from $10^{-6}$ S/m to 1 S/m. To illustrate the difference between radar methods and induction in accordance with the present invention, consider the operation of the present invention in wet clay with $\epsilon_r = 10$ and $\sigma = 0.2$ S/m. Typical center frequencies for radar systems and induction systems are 400 MHz and 20 kHz, respectively.

Using these parameter values and considering the expression for the propagation constant, the decay of the plane wave is $e^{-(11.0/m)z}$ for a radar signal and $e^{-(0.13/m)z}$ for an induction signal. Therefore, for every meter (m) of propagation the radar signal decays 95 dB whereas the induction signal decays only 17 dB. Consequently, in this case, only the induction system is useful for locating pipes that are buried at more than a few centimeters because it is less susceptible to the high signal attenuation of radar-based systems.

Figure 2:
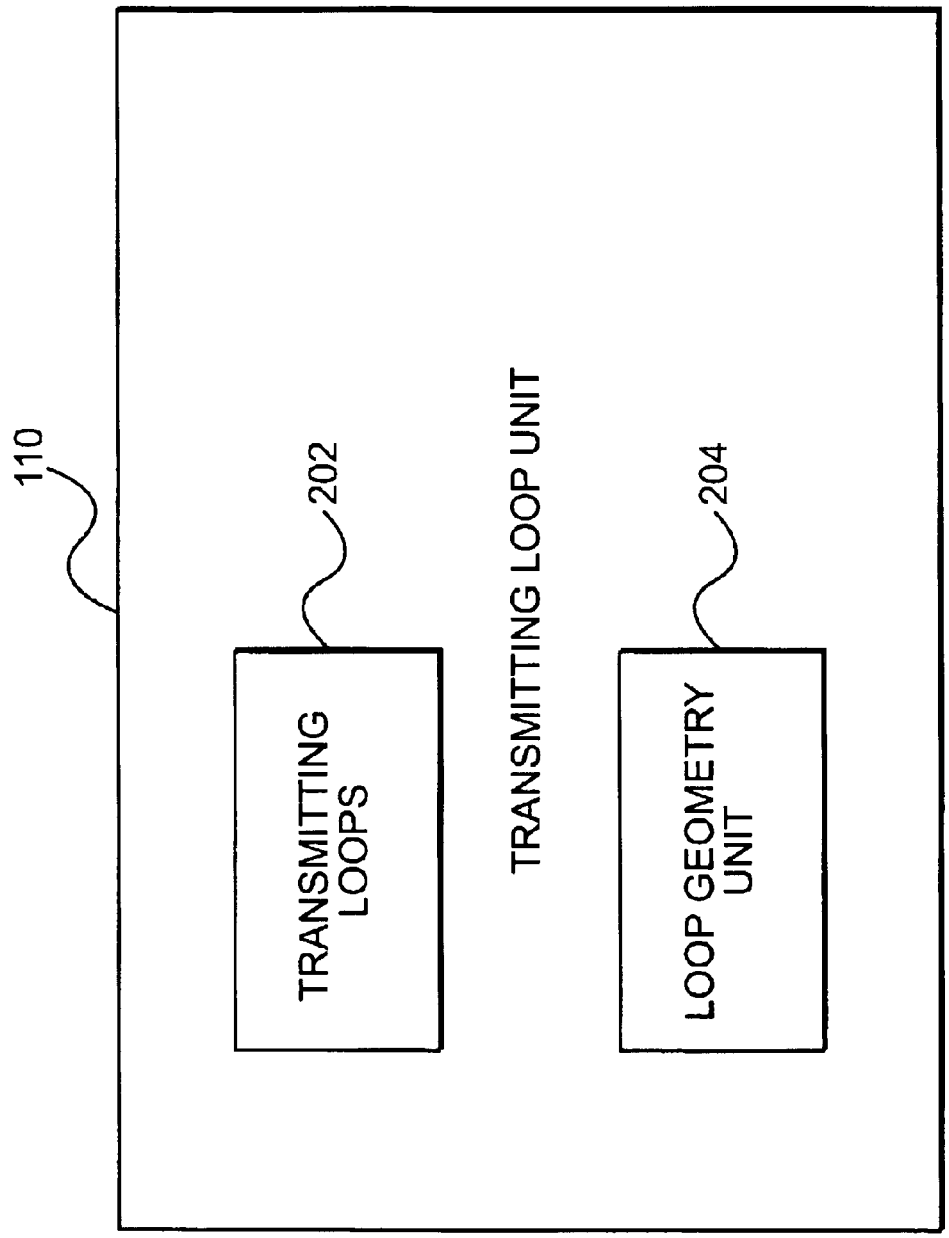
FIG. 2 is a block diagram of an embodiment of a transmitting loop unit consistent with the present invention.

Transmitting loop unit 110 transmits the signal generated by the system into the ground beneath the system. A block diagram of an embodiment of transmitting loop unit 110 is shown in FIG. 2. As shown in FIG. 2, transmitting loop unit 110 contains transmitting loops 202 and an optional loop geometry unit 204. Transmitting loops 202 conduct the DC current signal received from direct current generator 106. An embodiment of transmitting loops 202 are rectangular loop shaped antennas, approximately 2 meters in length, capable of operating in the 0 to 30 khz frequency range.

Loop geometry unit 204 determines the configuration of transmitting loops 202. The geometry of transmitting loops is controllable to accommodate diverse object location applications. For example, when surveying parking lots, a wide loop would be appropriate. Street surveys could use narrow loops, and square loops would be suitable for locating buried waste. Loop geometry unit 204 determines an appropriate shape for transmitting loops 202 so that the loops couple strongly to buried objects of arbitrary orientation. Embodiments of loop geometry unit 204 include, for example, software that computes and reports an appropriate loop geometry given parameters of a particular surveying application, an electromechanical structure that shapes a loop to take on a geometry that is appropriate, and a selector that selects from among loops within transmitting loop unit 110 in preconfigured geometries.

Figure 3:
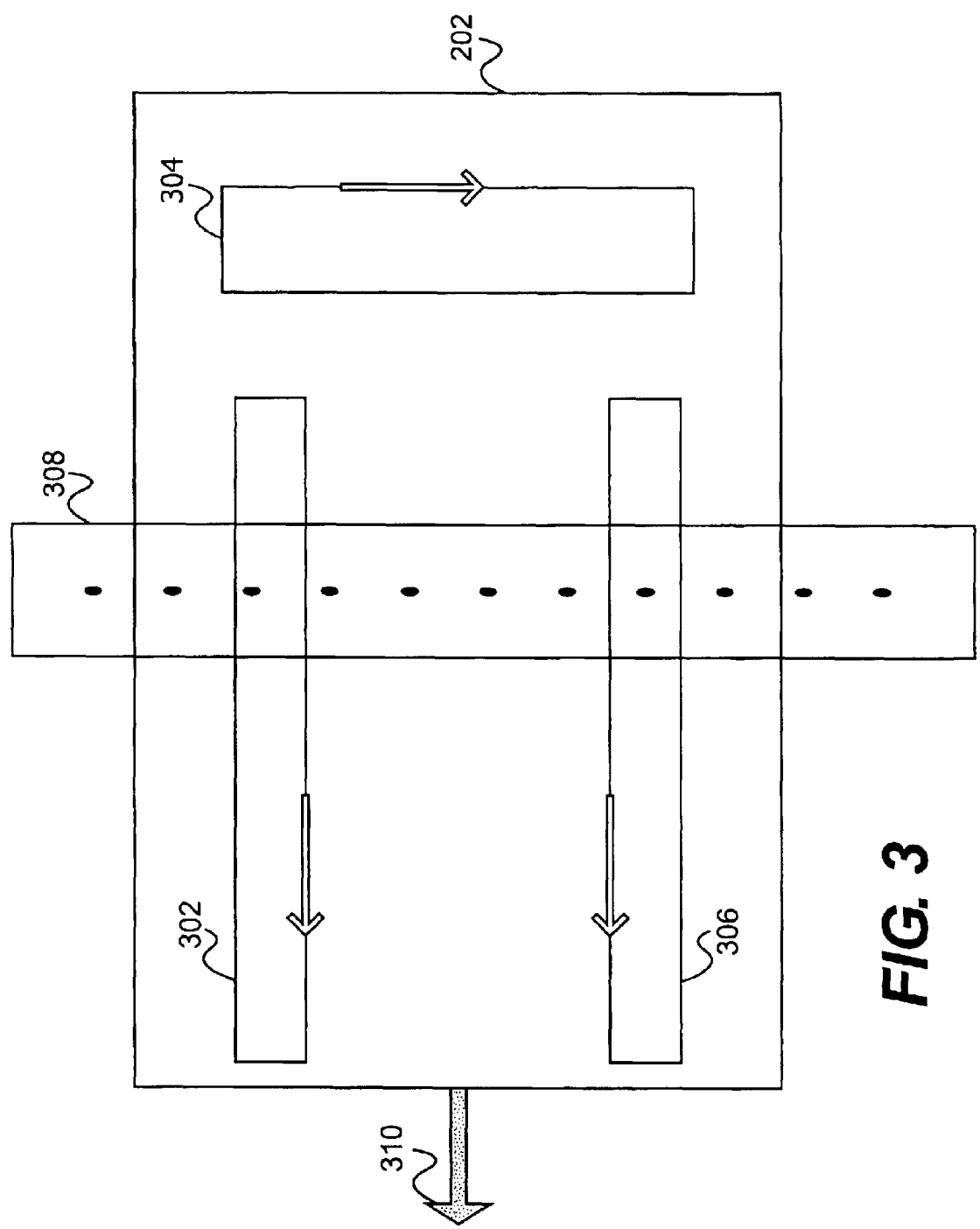
FIG. 3 is a schematic of an embodiment of transmitting loops and a receiver consistent with the present invention.

FIG. 3 is a schematic of one configuration of transmitting loops 202 determined by loop geometry unit 204 consistent with the present invention. In FIG. 3, loops 302, 304, and 306 comprise transmitting loops 202. Loops 302 and 306 are parallel to each other. Direct current generator 106 feeds current to loops 302 and 306, which creates a transient magnetic field that encircles conductors that are parallel to the direction of motion of the transmitting loops 202. Loop 304, which also receives a signal from direct current generator 106, creates a magnetic field that encircles conductors that are perpendicular to the direction of motion. The direction of current flowing through the loops is indicated by the arrow in each loop. Accordingly, strong current will be induced in objects having arbitrary orientation as the loops pass over them. Those skilled in the art will recognize that other transmitting loop geometries are consistent with the present invention including, for example, loops with axes that are parallel to the ground surface. Moreover, loops 302, 304, and 306 can each be comprised of an array of smaller loops.

Receiver 112 receives from the ground the transient magnetic field caused by the signal emitted from transmitting loop unit 110. Receiver 112 measures the magnetic field as a function of time. See, for example, Geonics Limited, Technical Note TN-7, J. D. McNeill, October 1980, p. 5, FIG. 2. An embodiment of receiver 112 consistent with the present invention is an array of receiver elements 308 co-located with transmitting loops 202 as shown in FIG. 3. Commercially available receiver array elements suitable for receiver 112 include, for example, RVR-3X coil with SIROTEM Mk 3 by Geoinstruments, PROTEM receiver by GEONICS, and TEM/3 magnetic antenna with GDP-32 receiver by ZONGE.

Locator 108 processes a signal from receiver 112 to determine the location of a target buried object. Techniques for locating buried objects consistent with the present invention include, for example, parametric inversion (see e.g., U.S. patent application Ser. No. 10/117,093, filed concurrently with the present patent application, by Michael Oristaglio, Thorkild Hansen, and Douglas Miller, entitled "Method and Apparatus for Locating Objects Using Parametric Inversion" incorporated by reference herein in its entirety) and techniques using spherical modeling.

Figure 4:
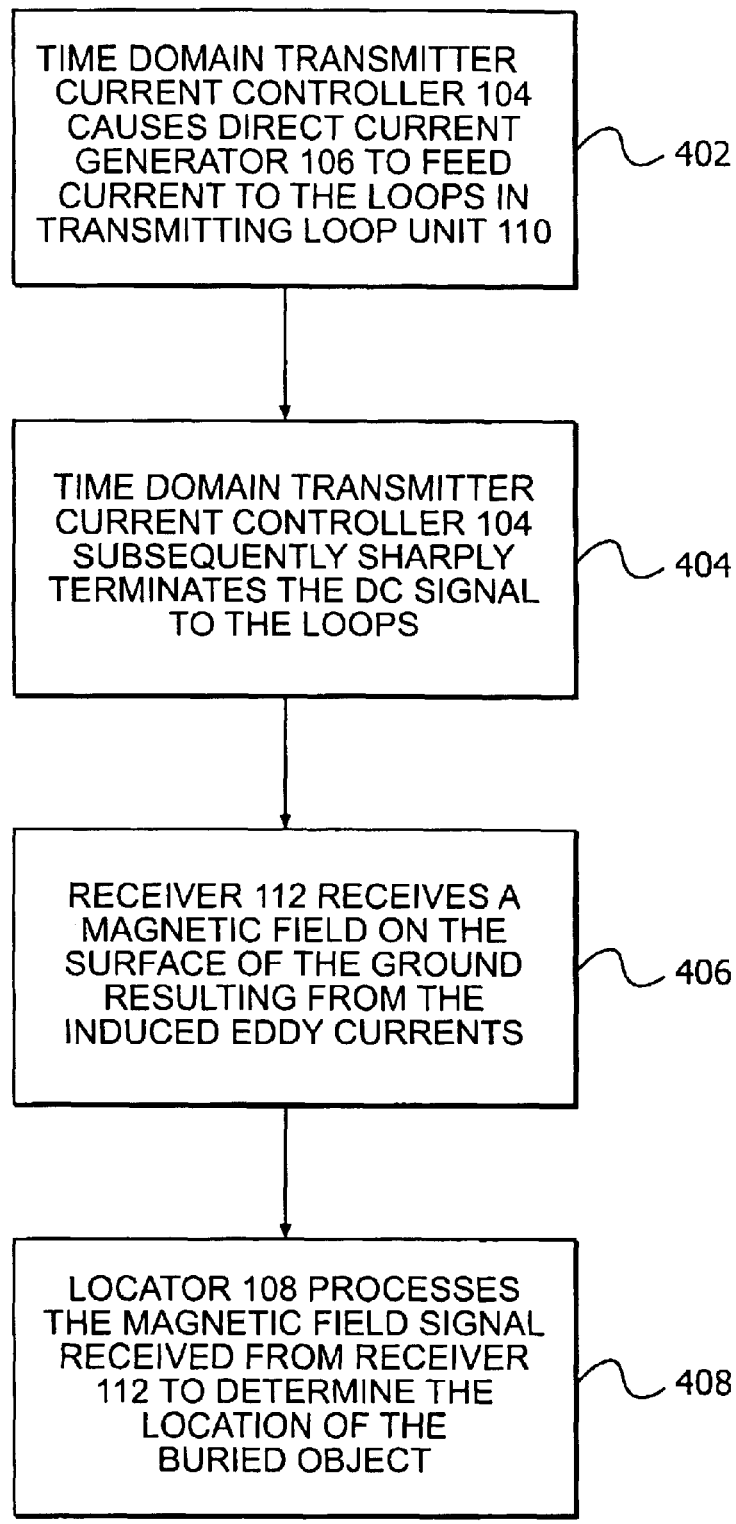
FIG. 4 is a flow diagram of a method for identifying buried objects using time domain induction consistent with the present invention.

FIG. 4 is a flow diagram of a method for locating a buried object using, for example, the apparatus of FIG. 1, consistent with the present invention. Time domain transmitter current controller 104 causes direct current generator 106 to feed current to the loops in transmitting loop unit 110 (step 402). Time domain transmitter current controller 104 subsequently sharply terminates the DC signal to the loops according to, for example, a linear ramp function (step 404). One skilled in the art will recognize that other DC signal control functions for modulating the current signal to the transmitting loop unit 110 are consistent with the present invention, including, but not limited to exponential, sine, and cosine functions. This sharp termination creates, in accordance with the induction law, a primary transient field in transmitting loop unit 110 that induces eddy currents in conductive soils and in other conductors. For further detail on this induction phenomenon see Geonics Limited, Technical Note TN-7, J. D. McNeill, October 1980 and "*Electromagnetic Methods in Applied Geophysics*," Chapter 6, Society of Exploration Geophysicists, 1991. The induced eddy currents decay with time and tend to concentrate in regions with high conductivity and channel into elongated objects such as conductive pipes.

For a fixed strength DC signal, the induced magnetic energy increases with the size of the loops in transmitting loop unit 110. Consequently, the turn off time for the DC signal controlled by time domain transmitter current controller 104 decreases with loop size. Time domain transmitter current controllers consistent with present invention provide turn off times, for example, on the order of 5–50 microseconds for loops with side lengths on the order of 100 meters. When smaller loops are used in transmitting loop unit 110 (e.g., square loops with 20 meter sides), time domain controller 104 establishes a shorter turn off time for the signal generated by direct current generator 106, for example, on the order of 1.5 microseconds. A turn off time suitable for locating buried pipes consistent with the present invention is on the order of 10 microseconds for a 3 meter loop. The NT 20, for example, is capable of achieving these turn off times.

When transmitting loop unit 110 passes over a buried conductive object, the magnetic field caused by the induced eddy currents will, after a period of time, for example in the range of 100–300 picoseconds, approximately equal the magnetic field of a line current that runs along the conductive object. It is known that the magnetic field from a line current determines uniquely the location of the line current. Accordingly, receiver 112 receives a magnetic field on the surface of the ground resulting from the induced eddy currents (step 406). Locator 108 processes the magnetic field signal received from receiver 112 to determine the location of the buried object (step 408). If the buried object is nonconducting, the induced eddy currents will not be able to flow in the region occupied by the object, thereby creating an eddy current void. The magnetic field detected by receiver 112 will be reduced by this void and consequently locator 108 is able to identify the location of the nonconducting object.

The time domain induction system functions described for each of the elements above can be distributed or combined differently than stated above and still fall within the scope of the invention. For example, a system consistent with the present invention can be implemented using a single processor or group of processors that execute software stored in a central memory, wherein the software relates to each of the above-described system operations. Moreover, in embodiments consistent with the scope of the present invention, the functions described herein can be implemented entirely in hardware, or in embodiments allocating the described functions among hardware and software elements.

The operation of the time domain induction system elements as defined above provide an efficient system to rapidly and accurately locate buried objects. Therefore, in accordance with the present invention, the disclosed system elements can be housed in many types of structures, including portable and mobile structures to allow rapid and accurate real-time surveying of a region of interest.

Figure 5:
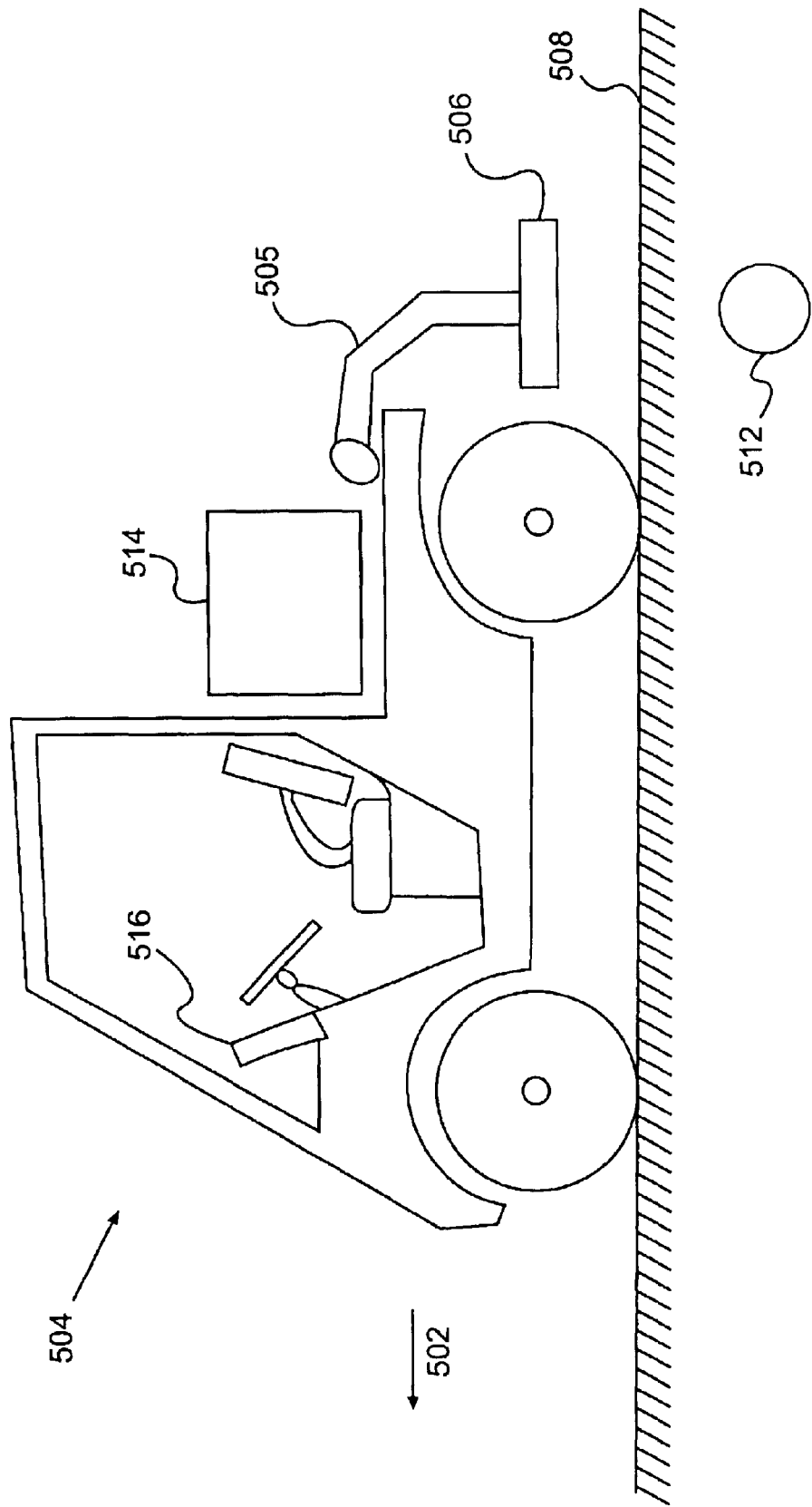
FIG. 5 is a schematic diagram of a mobile vehicle with a time domain induction system consistent with the present invention.

FIG. 5 is a diagram of a mobile vehicle 504 with a time domain induction system, consistent with this invention. A transmitting loop unit and receiver unit 506 attaches to arm 505, which attaches to the back a vehicle 504, as shown in FIG. 5. Unit 506 may comprise transmitting loops and at least one receiving antenna. Vehicle 504 may move in a direction shown by arrow 502. Transmitting loop unit portion of unit 506 induces eddy currents into ground 508. The induced eddy currents create a magnetic field indicative of a buried object, such as subterranean pipe 512, and the receiver unit portion of unit 506 may receive reflected waveforms. Module 514 on the back of vehicle 504 may comprise elements of system controller 102 that control unit 506 and process signals received by the receiver in unit 506, described in greater detail above in FIG. 1. It may also display images of the surveyed area on display 516 for the operator.

Figure 6:
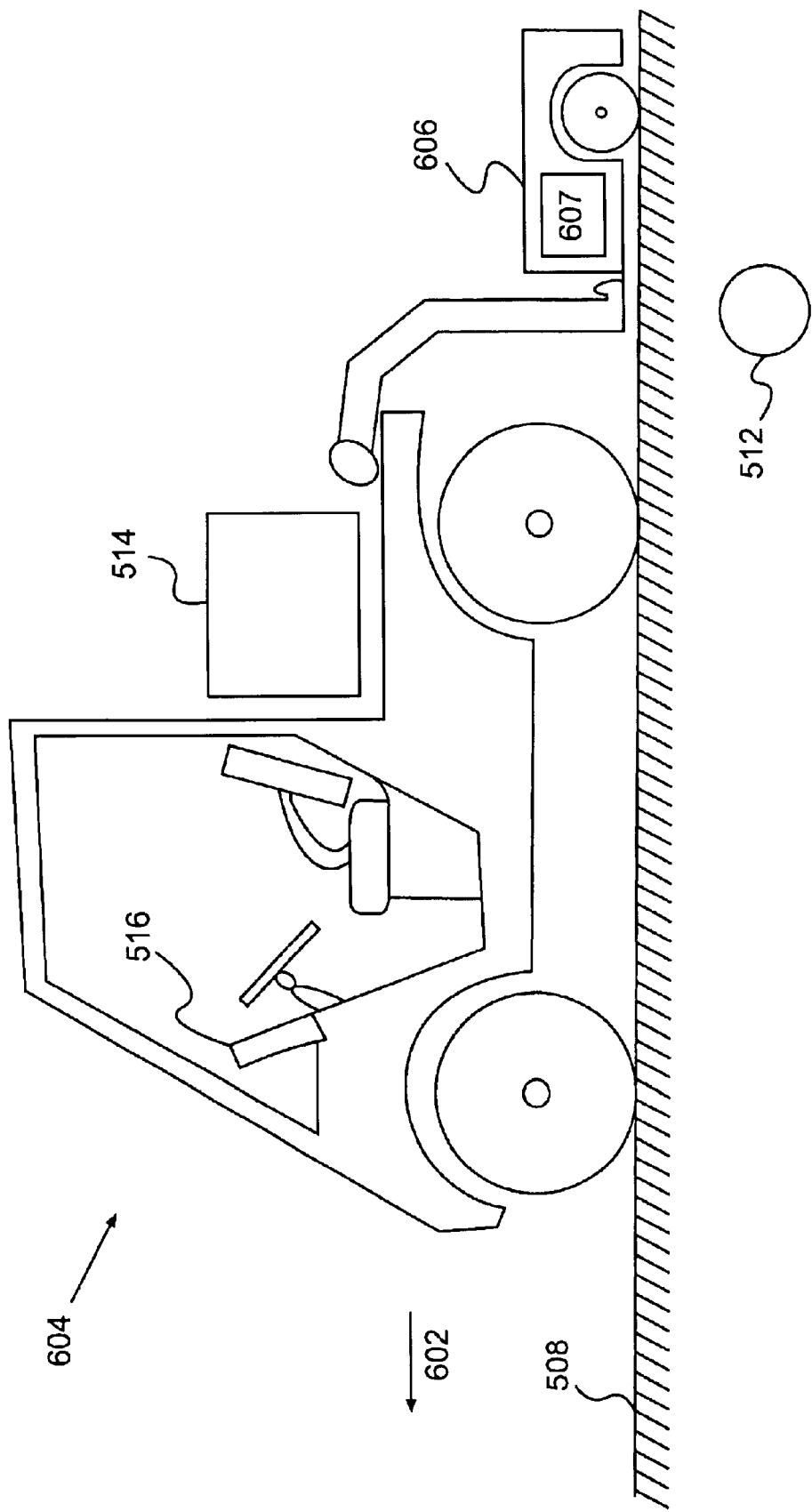
FIG. 6 is a schematic diagram of a mobile vehicle with a time domain induction system consistent with the present invention.

FIG. 6 is a diagram, consistent with this invention, of mobile vehicle 604 with a trailer 606 having a time domain induction system consistent with the present invention. In the embodiment shown in FIG. 6, a transmitting loop unit and receiver 607 is within trailer 606, which is attached to vehicle 604. Trailer 606, pulled by vehicle 604, moves in the direction of arrow 602. The mobile vehicle of FIG. 6 also includes display 516 and module 514 as described above for the mobile vehicle in FIG. 5.

Figure 7:
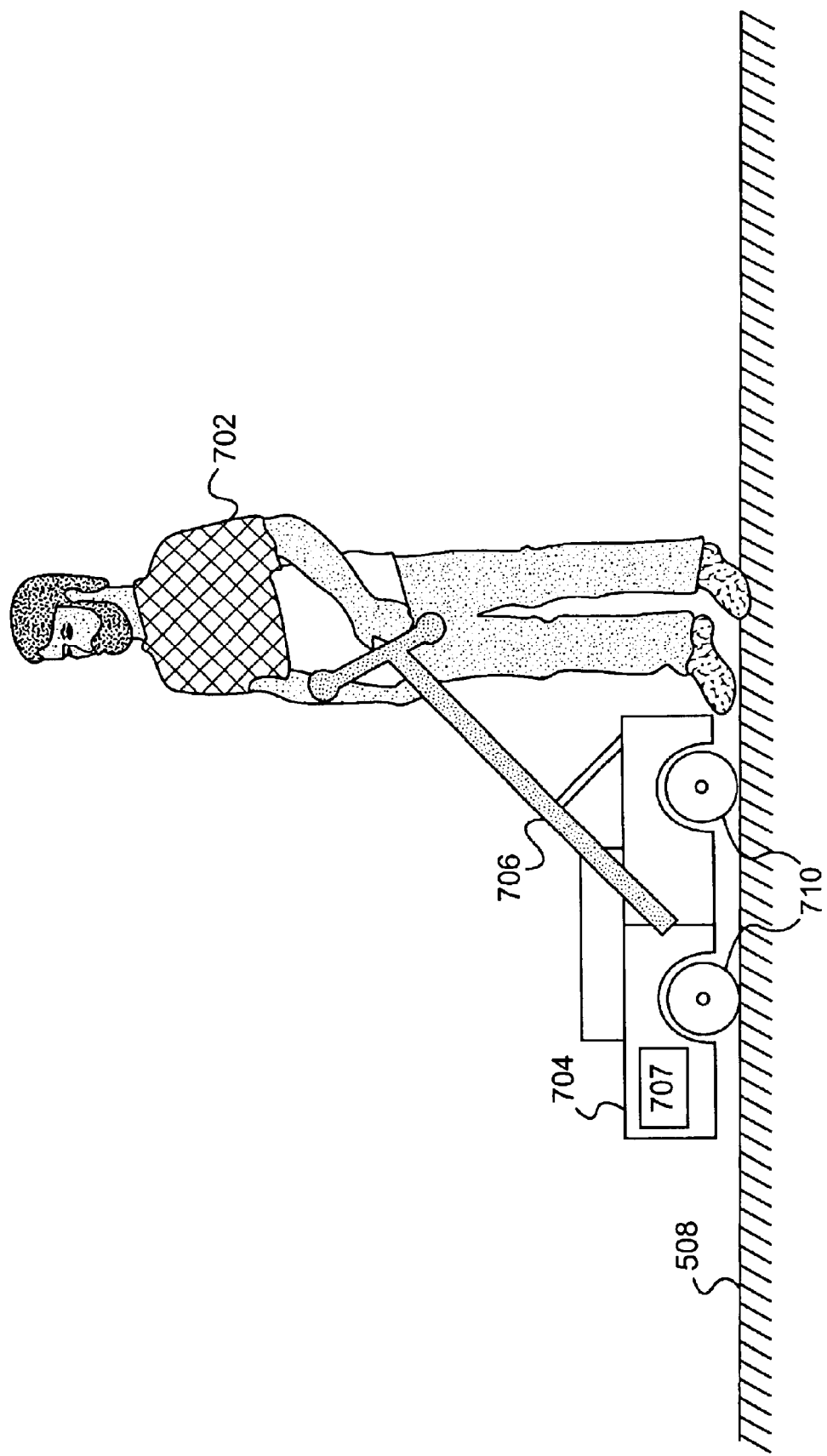
FIG. 7 is a schematic diagram of a portable unit with a time domain induction system consistent with the present invention.

FIG. 7 is a diagram of a portable housing 704 with a time domain induction system consistent with this invention. In the embodiment shown in FIG. 7, a transmitting loop unit and receiver 707 is within portable housing 704. A user 712 may guide portable housing 704 over ground 508 using a handle 706. Portable housing 704 may have, for example, wheels 710 or skid pads (not shown). An embodiment of portable housing 704 can also be made sufficiently light to allow an operator to carry the entire system, thereby alleviating the need for wheels, skid pads, or similar structure to guide the housing over the ground.

It will be apparent to those skilled in the art that various modifications and variations can be made to the disclosed embodiments of the present invention without departing from the spirit or scope of the invention. Thus it is intended that the present invention cover modifications and variations of this invention that are within the scope of the appended claims and their equivalents.

We claim:

1. A method for locating a buried object in soil comprising:

moving at least one transmitting loop in a direction over the soil, said at least one transmitting loop comprising a first elongated conductor orientated in a predetermined relationship to the direction of movement and a second elongated conductor oriented substantially perpendicular to the orientation of the first elongated conductor;

as the at least one transmitting loop moves over the soil, creating a direct current in the conductors of the at least one transmitting loop;

periodically interrupting the direct current in the conductors of said at least one transmitting loop to create an eddy current in the soil using time domain induction;

receiving a magnetic field resulting from the eddy current running through the soil; and locating the buried object using the received magnetic field.

2. The method of claim 1 further comprising:

selecting a loop geometry for an object location application, from among a plurality of loop geometries; and performing the moving and creating steps using the at least one transmitting loop with the selected loop geometry.

3. The method of claim 2, wherein the selecting step comprises selecting a loop geometry so as to couple the magnetic field of said at least one transmitting loop to a buried object.

4. The method of claim 1 wherein the step of locating the buried object comprises the substep of: measuring a magnetic field created by the eddy current flowing through the buried object.

5. The method of claim 1 wherein the step of locating the buried object comprises the substep of: measuring a magnetic field attenuated by the buried object impeding the eddy current flowing through the soil.

6. The method of claim 1, wherein the first conductor is oriented substantially parallel to the direction of movement, and the second conductor is oriented substantially perpendicular to the direction of movement.

7. A method for locating a buried object in conductive soil comprising:

creating a direct current in at least one transmitting loop;

periodically interrupting the direct current in said at least one transmitting loop to create an eddy current in the conductive soil using time domain induction;

receiving a magnetic field resulting from the eddy current running through the conductive soil; and locating the buried object using the received magnetic field, wherein the step of locating the buried object comprises the substep of using a parametric inversion algorithm.

8. A method for locating a buried object in conductive soil comprising:

creating a direct current in at least one transmitting loop;

periodically interrupting the direct current in said at least one transmitting loop to create an eddy current in the conductive soil using time domain induction;

receiving a magnetic field resulting from the eddy current running through the conductive soil; and locating the buried object using the received magnetic field, wherein the step of locating the buried object comprises the substep of using a sphere model.

9. An apparatus for locating a buried object in soil comprising:

a platform moveable in a direction over the soil;

at least one transmitting loop mounted on the platform for movement therewith, said at least one transmitting loop comprising a first elongated conductor oriented substantially parallel to the direction of movement and a second elongated conductor oriented substantially perpendicular to the direction of movement;

a direct current generator feeding direct current to the conductors of said at least one transmitting loop, during movement of the platform and the at least one transmitting loop over the soil;

a time domain transmitter current controller;

a magnetic field detector; and a locator for locating the buried object using a received magnetic field resulting from an eddy current running through the soil.

10. The apparatus of claim 9, wherein:

the at least one transmitting loop comprises three rectangular transmitting loops;

one of the three rectangular transmitting loops comprises conductors perpendicular to the direction of movement; and each of the other two of the three rectangular transmitting loops comprises conductors parallel to the direction of movement.

11. The apparatus of claim 9, wherein an axis of said at least one transmitting loop is parallel to the ground surface.

12. The apparatus of claim 9, wherein the platform is mounted on a mobile vehicle.

13. The apparatus of claim 9, wherein the platform is mounted in a portable housing.

14. An apparatus for locating a buried object in soil comprising:

at least one transmitting loop;

means for moving the at least one transmitting loop in a direction over the soil, wherein said at least one transmitting loop comprises a first elongated conductor substantially parallel to the direction of movement and a second elongated conductor substantially perpendicular to the direction of movement;

means for creating a direct current in the conductors of the at least one transmitting loop, during the movement of the at least one transmitting loop;

means for periodically interrupting the direct current in the conductors of said at least one transmitting loop to create an eddy current in the soil using time domain induction;

means for receiving a magnetic field resulting from the eddy current running through the soil; and means for locating the buried object using the received magnetic field.

15. The apparatus of claim 14 further comprising:

means for selecting a loop geometry for an object location application, from among a plurality of loop geometries; and means for adapting the at least one transmitting loop to have the selected loop geometry.

16. The apparatus of claim 14 further comprising: means for selecting a loop geometry so as to couple the magnetic field of said at least one transmitting loop to a buried object.

17. The apparatus of claim 14 wherein the means for locating the buried object comprises: means for measuring a magnetic field created by the eddy current flowing through the buried object.

18. The apparatus of claim 14 wherein the means for locating the buried object comprises means for measuring a magnetic field attenuated by the buried object impeding the eddy current flowing through the soil.

19. An apparatus for locating a buried object in conductive soil comprising:

means for creating a direct current in at least one transmitting loop;

means for periodically interrupting the direct current in said at least one transmitting loop to create an eddy current in the conductive soil using time domain induction;

means for receiving a magnetic field resulting from the eddy current running through the conductive soil; and means for locating the buried object using the received magnetic field, wherein the means for locating the buried object comprises means for using a parametric inversion algorithm.

20. An apparatus for locating a buried object in conductive soil comprising:

means for creating a direct current in at least one transmitting loop;

means for periodically interrupting the direct current in said at least one transmitting loop to create an eddy current in the conductive soil using time domain induction;

means for receiving a magnetic field resulting from the eddy current running through the conductive soil; and means for locating the buried object using the received magnetic field, wherein the means for locating the buried object comprises: means for using a sphere model.

21. A method for locating a buried object in a medium comprising:

selecting a transmitting loop geometry for the location of the buried object, from among a plurality of possible loop geometries;

setting the geometry of at least one transmitting loop to the selected geometry;

moving the at least one transmitting loop across the medium;

creating a direct current in at least one transmitting loop;

interrupting the direct current in the at least one transmitting loop to create an eddy current in the medium using time domain induction;

receiving a magnetic field resulting from the eddy current running through the medium; and locating the buried object using the received magnetic field.

22. The method of claim 21, wherein the step of creating the direct current comprises:

creating a flow of direct current parallel to a direction of the movement of the at least one transmitting loop across the medium; and creating a flow of direct current perpendicular to a direction of the movement of the at least one transmitting loop across the medium.

23. The method of claim 21 wherein the step of locating the buried object comprises the substep of:

measuring a magnetic field created by the eddy current flowing through the buried object.

24. The method of claim 21 wherein the step of locating the buried object comprises the substep of:

measuring a magnetic field attenuated by the buried object impeding the eddy current flowing through the medium.

25. An apparatus for locating a buried object in soil, comprising:

a platform moveable over the soil;

at least one transmitting loop mounted on the platform for movement therewith;

means for setting geometry of the at least one transmitting loop to a geometry selected from among a plurality of transmitting loop geometries;

a direct current generator for feeding current to the at least one transmitting loop;

a time domain transmitter current controller, for controlling the direct current fed through the at least one transmitting loop;

a magnetic field detector; and a locator for locating the buried object using a received magnetic field resulting from an eddy current running through the soil.

* * * * *